Dec. 27, 1960 J. E. PANZA 2,966,143
PNEUMATIC CONTROL SYSTEM
Filed July 18, 1957 3 Sheets-Sheet 1

INVENTOR.
Joseph E. Panza
BY
Byron, Hume, Troen & Clement
Attorneys

Dec. 27, 1960  J. E. PANZA  2,966,143
PNEUMATIC CONTROL SYSTEM
Filed July 18, 1957  3 Sheets-Sheet 2

INVENTOR.
Joseph E. Panza
BY
Byron, Hume, Groen & Clement
Attorneys

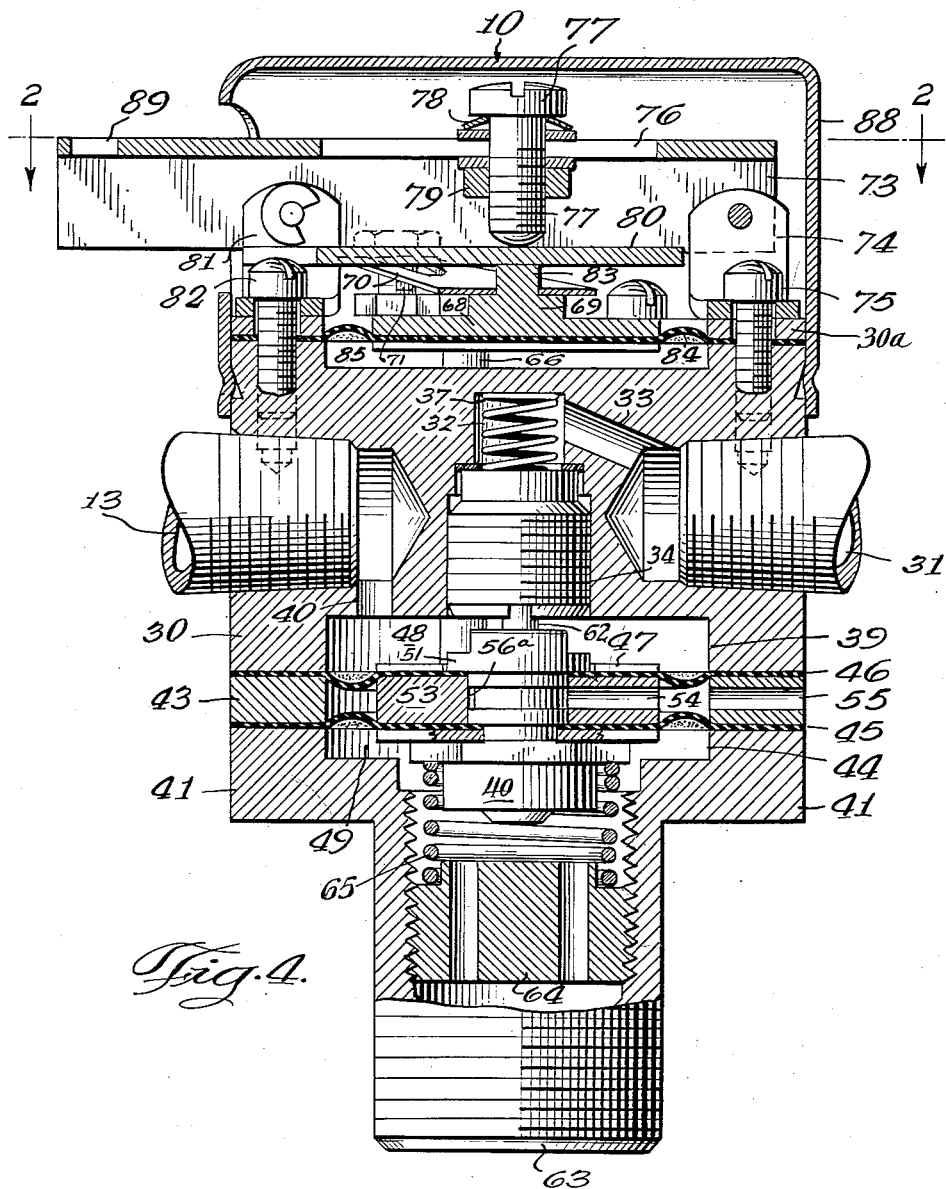

United States Patent Office 2,966,143
Patented Dec. 27, 1960

2,966,143
PNEUMATIC CONTROL SYSTEM

Joseph E. Panza, Arlington Heights, Ill., assignor to The Powers Regulator Corporation, Skokie, Ill., a corporation of Illinois Filed July 18, 1957, Ser. No. 672,593

6 Claims. (Cl. 121—41)

This invention pertains to a system for automatically controlling a measured variable and in particular a system comprising a pneumatic controller, a relay valve, and a motor valve.

Pneumatic sensing devices have been improved to a point whereby minute changes of the measured variable may be measured in an extremely precise manner. To realize the advantages of such an instrument necessitates comparable precision in the motor valve which controls the measured variable. Because of the effects of friction and other error inducing forces in air pressure operated motors, the motor valve many times will not respond accurately to the signals from the pneumatic controller. By incorporating a positioning relay in the control system, the effect of friction and other error inducing forces can be eliminated. The positioning relay regulates the position of the motor valve regardless of the air pressure needed to actuate the motor valve. At the same time position of the motor valve is correlated with the signal received by the relay valve from the sensing device.

It is an object of the invention to provide an automatic control sysem that will accurately measure the changes in the measured variable and make comparable adjustments to bring the measured variable back to the desired level.

Another object of the invention is to provide a relay valve that will accurately interpret signals from the pneumatic controller and transmit them to the valve motor.

Many of the positioning relays that are presently available are cumbersome in construction and require considerable space for their installation. The present relay valve included in the invention is small and compact and may be installed in a confined area. Therefore, a still further object of this invention is to provide a relay valve of relatively simple and inexpensive structure which is light in weight and compact in size.

A still further object of the invention is to provide a relay valve which will accurately control the motor valve in accordance with the pressure signal communicated to it by the pneumatic controller.

A still further object of this invention is to provide a control system in which error, induced by friction or the like, in the motor valve is substantially eliminated.

A still further object of the invention is to provide a control system that will accurately position the motor valve and will overcome any external forces on the motor valve that will tend to inhibit its responses.

A still further object of the invention is to proved a relay valve in which the sensitivity is easily adjusted.

Still further objects will be apparent upon development of the specification with reference to the following drawings.

The invention may be briefly described as the combination of a pneumatic sensing device, a pneumatic relay valve, and a motor valve. The relay valve is controlled by the signals resulting from changes of the measured variable sensed by the sensing device. When a change occurs in the measured variable, the relay valve operates to allow high pressure air to flow from a suitable source to the motor valve or conversely exhaust from the motor valve. In this manner the motor valve is actuated to in turn operate a valve or other suitable means for controlling the measured variable. The relay valve is so interrelated with the motor valve that, regardless of the amount of friction or other error inducing forces in the motor valve, the latter will be accurately positioned by the high pressure air in accordance with the signal from the sensing device.

In the drawings:

Figure 4 is a sectional view taken along lines 4—4 of Figure 2.

Figure 1:
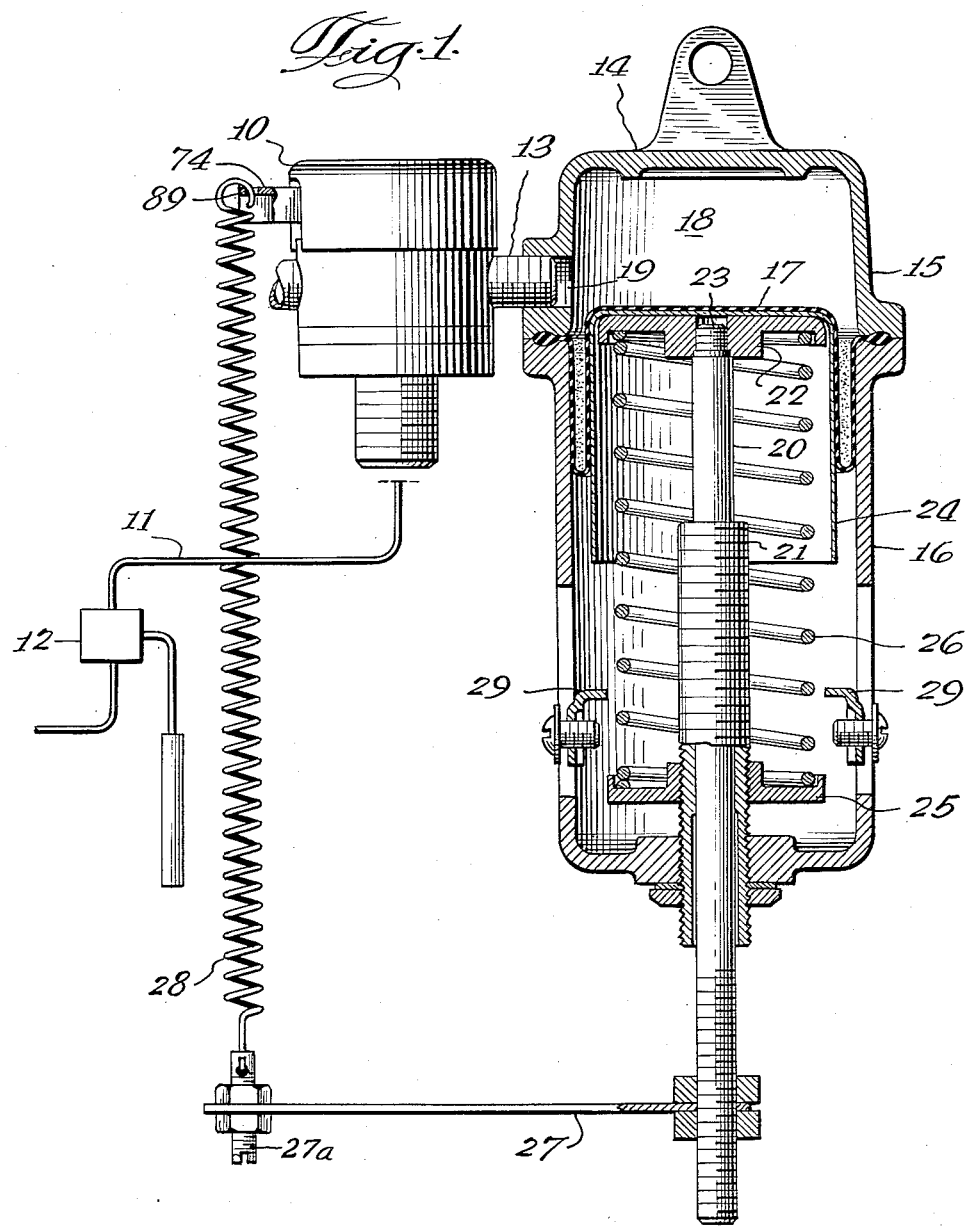
Figure 1 is a diagrammatic illustration of the control system embodying the invention.

Referring now to Figure 1, there is shown a relay valve generally denoted by numeral 10. Connected to the valve 10 by means of the pipeline 11 is a pneumatic signal generating condition response controller 12 which is adapted to measure minute changes in the measured variable. The condition response controller 12 may be any of the well known types that communicate a pressure signal proportional to the change in the measured variable.

By measured variable is meant any system in which the changes therein may be measured or sensed by a pneumatic signal generating condition response controller. One use to which such a controller is readily adaptable is the measurement of thermostatic changes in a liquid or gas. However, it will be obvious that the system described herein is adaptable for a variety of other uses. Consequently, the aforementioned use is merely by way of example rather than limitation.

Connected to the relay valve by means of the port 13 is a motor valve 14. The motor valve is comprised of an upper casing member 15 and a lower casing member 16. Clamped between the flanges of the casing members 15 and 16 is a flexible diaphragm member 17 which defines a pressure chamber 18. Leading into the pressure chamber 18 is the inlet port 19 which communicates with the relay valve 10 and in turn a source of high pressure air. In the lower casing 15 is a valve stem 20, which is slidably received in the sleeve 21 in the bottom of the casing 16. The end of the stem 20 enclosed within the casing 16 is secured to the disk member 22 by threads 23. An inverted cup 24 rests upon the disk member 22 and extends downward coaxial with the stem 20. As shown in Figure 1, the flexible diaphragm 17 assumes the shape of the cup 24 and is generally held thereto by the pressure in the chamber 18. A second disk member 25 is threadably secured to the sleeve 21 near the bottom of the casing 16 and is adjustable thereon. The two disk members 22 and 25 co-operate to confine the spring 26 therebetween to resiliently position the stem 20. The exposed end of the stem 20 threadably engages the arm 27 to which is adjustably secured the spring 28 by the screw 27a. The purpose of the spring 28 will be apparent upon further development of the specification. The stem 20 is mechanically connected to a valve (not shown) or other suitable means for controlling the measured variable.

It is now apparent that if the air pressure is increased in the pressure chamber 18, the stem 20 would be forced downwardly against the force of the spring 26 carrying the lever 27. Conversely if the pressure in chamber 18 is decreased, the stem will be forced upwardly by the spring 26. Although they are not necessary to the practice of the invention, it may be desirable to provide stop members 29 to limit the downward travel of the stem 20 or the cup 24.

Figures 2, 3:
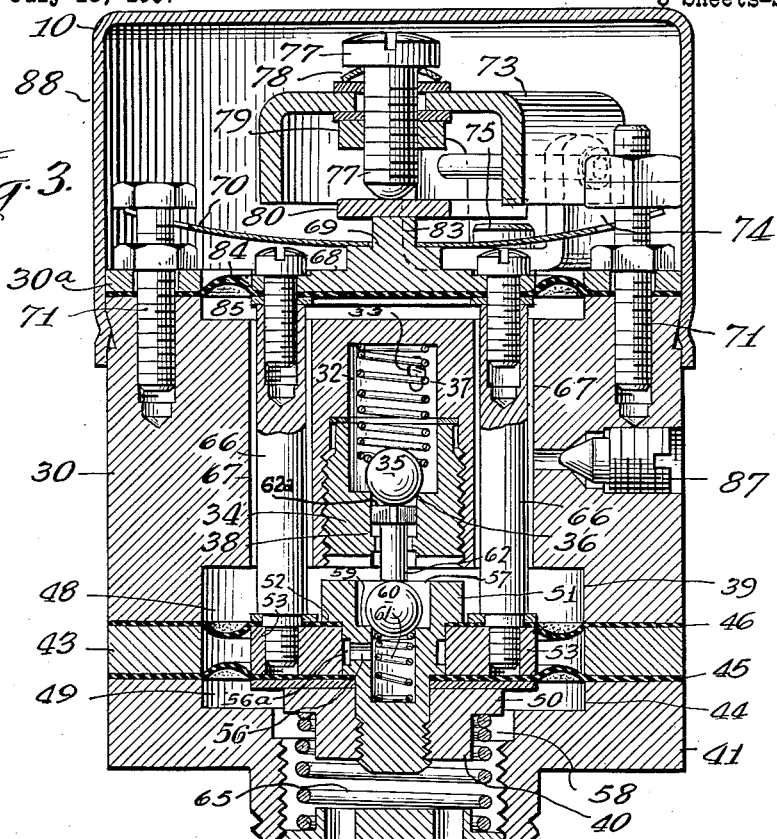
Figure 2 is a plan view of the positioning relay included in the control system.
Figure 3 is a sectional view taken along lines 3—3 of Figure 2.

Referring now to Figures 3 and 4, it is shown that the relay valve 10 is comprised of a casing 30 provided with an inlet port 31 and an outlet port 13. The inlet port 31 communicates with a suitable source of air pressure (not shown). The casing 30 includes a pressure chamber 32 which is connected to the inlet port 31 by the duct 33. A valve member 34 is threadably received in the pressure chamber 32 and is in sealing engagement with the casing 30. A ball valve 35 is adapted to seat on the shoulder 36 of the valve member 34 and is normally held in seating position by the coil spring 37 confined within the pressure chamber 32. The ball valve 35, when open, permits egress of the air from the pressure chamber 32 through the bore 38 in the valve member 34. As the air leaves the bore 38, it passes through the circular chamber 39 into the duct 40 and finally into the pressure chamber 18 of the motor valve 14. A cover 41 and an annular ring 43 is secured to the lower end of the casing 30 by some suitable means. The cover 41 is provided with a circular chamber 44 substantially of the same diameter as the circular chamber 39 in the casing 30. A pair of spaced annular diaphragm members 45 and 46 are clamped at the outer edges by co-operation of the cover 41 with the annular ring 43 and the annular ring 43 with the casing 30 respectively. The diaphragm members 45 and 46 are clamped at the inner peripheries by the valve member generally denoted by the numeral 47. Thus the chamber formed by the chambers 39 and 44 is divided into two compartments 48 and 49 by the diaphragm members 45 and 46 and the valve member 47.

The valve member 47 is comprised of a body portion 50 threadably receiving the plug 51 which is provided with the shoulders 52. The shoulders 52 co-operate with the body portion to confine the annular member 53 therebetween. As was mentioned previously, the upper diaphragm member is clamped between the shoulder 52 and the annular member 53 and similarly the lower diaphragm member 45 between the annular member 53 and the body portion 50.

The plug 51 is provided with two concentric bores 57 and 58 of different diameters so that they define the shoulder 59. As shown in Figure 3, the plug 51 is provided with the exhaust port 56 which terminates in the annulus 56a. As shown in Figure 4 the annulus communicates with the duct 54 which in turn is connected to a second duct 55 by the diaphragm members 45 and 46. The duct 55 is always open to atmosphere so that the pressure between the two diaphragm members 45 and 46 is substantially atmospheric. A ball valve 60 is received within the bore 57 and is adapted to seat on the shoulder 59 to prevent exhausting of the air to atmosphere through the aforementioned ducts. A coil spring 61 which biases the ball 60 toward an unseated position is confined within the bore 58. The spring 61 is of a lower rate than the spring 37 as will be apparent later on in the specification.

A pin member 62 which is of sufficient length to be in touching relationship with the ball valves 35 and 60 when the diaphragm members 45 and 46 are in their neutral position or have been deflected upwardly is slidably received within the bore 38. The pin member 62 has a shoulder 62a which is channeled to permit substantially unrestricted flow through the bore 38. When the pin member 62 is in touching relationship with both the ball valves 35 and 60, the latter is held in its seated position against the force of the spring 61 by the greater force of the spring 37 as was mentioned previously.

The chamber 44 is provided with the pressure port 63 which communicates with the pneumatic controller 12. An adjustable spring retaining member 64 is threadably received within the pressure port 63 and co-operates with the body portion 50 of the valve member 47 to confine the coil spring 65 therebetween. The coil spring 65 may be adjusted to any desired preload by turning the retaining member 64 within the aforementioned threads. The purpose of the spring 65 is to compensate for the weight of the structural elements tending to force the diaphragm members 45 and 46 downward and the differential force between valve springs 37 and 61, as will be apparent later on.

Two or more posts 66 are secured to the outer periphery of the annular member 53 and extend upwardly through the apertures 67 in the casing 30. The upper ends of the post 66 are secured to the generally circular plate 68 provided with the centrally located stepped portion 69.

A clamping member 30a is secured to the casing 30 by the stud members 71. A flexible cover 84 is secured at its outer periphery by the clamping member 30a and extends across the generally circular chamber 85. The flexible cover 84 is also secured to the circular plate 68 by the posts 66 as best shown in Figure 3. This flexible cover serves to equalize the pressure exerted on the diaphragm 46 in the compartment 48 and also prevents dirt or other foreign material from entering into the valve chambers. As best shown in Figure 3, the pressure in compartment 48 is communicated through the apertures 67 into the chamber 85. Thus the downward force on the diaphragm members 45 and 46 is neutralized by the equal and opposite upward force on the flexible cover 84 so that the only pressure sensed by the diaphragm assembly is that in port 63.

A leaf spring 70 is confined at its ends by the stud members 71 so that it rests upon the shoulder 72 of the stepped portion 69. The leaf spring is normally curved so that the preload on the spring may be varied by adjusting the confining height of the stud member 71. The purpose of the leaf spring is to prevent movement of the diaphragm members 45 and 46 until the pressure signal received in the pressure port 63 is of a predetermined magnitude.

As shown in Figure 3, the casing 30 is provided with a bleed screw 87 for the purpose of exhausting any air entrapped therein. This is particularly important during the shutdown of the system or when it is necessary to make some manual adjustment of either the relay valve or the motor valve.

Referring now to Figures 2 and 4, there is shown a lever 73 which is pivotally connected at one end to the post 74 which in turn is secured to the casing 30 by the stud 75. The free end of the lever 73 is provided with means 89 for connecting it to one end of the spring 28. Slidably secured to the lever 73 for movement within the slot 76 is a fulcrum member 77 comprising the spring washer 78 and guide member 79. Obviously the fulcrum 77 may be constructed in numerous other ways which will permit the fulcrum to be moved along the slot 76. The fulcrum member 77 rests upon a second lever 80 which underlies the first lever 73. The second lever 80 is pivotally secured to the post 81 substantially diametrically opposite the post 74 to the casing 73 by the stud 82. As shown in the drawings, the second lever 80 rests upon the upper step 83 of the stepped portion 69. By this arrangement the spring 28 continually exerts on the diaphragm assembly a downward force which is counterbalanced by the pressure in port 63 when the system is in equilibrium. The purpose of the dual lever system as described is to permit adjustment of the fulcrum. In this manner the relationship of the stem travel may be varied with respect to the force exerted on the lever 73. For example, the fulcrum may be so positioned that the system traverses its entire range within three p.s.i.; on the other hand, it may be so positioned that its range encompasses 15 to 20 p.s.i. As shown in Figures 3 and 4, it may be desirable to enclose the lever system with the cover 88 for purposes of protection.

The operation of the relay valve will now be briefly described. If the change in the measured variable results in an increased pressure signal to the pressure port 63, the valve member 47 and the diaphragm members 45 and 46 are forced upwardly against the force of spring 28. As the valve member 47 moves upwards, the pin 62 unseats the ball valve 35. When the ball valve 35 opens, high pressure air flows from the pressure chamber 32 to the compartment 48 and then into the pressure chamber 18 of the motor valve 14. The increase in pressure in the pressure chamber 18 forces the stem downwardly to adjust the measured variable. As the stem moves, it carries the lever 27 which increases the tension on the spring 28 to exert a downward force on the lever 73. As the lever 73 moves downwardly, the movement is transmitted to the diaphragm members 45 and 46 so as to restore them to their neutral positions. When the force on the lever 73 is sufficient to move the diaphragm members to their neutral positions, the ball valve 35 is restored to its seated position on the shoulder 36. When that happens, the system is in equilibrium and the measured variable has been restored to the desired level. Conversely, if the change in the measured variable should result in a decreased pressure signal, the valve member 47 and the diaphragm members 45 and 46 will be moved downwardly by the force of spring 28. When this happens, the ball valve 60 is no longer held in the seated position by pin 62 but is biased open by the coil spring 61. The air in the pressure chamber 18 may then flow through the compartment 48 and out the port 56 into the exhaust ducts 54 and 55 to the atmosphere. As the pressure in the chamber 18 decreases, the force of the spring 26 forces the stem upwardly, at the same time decreasing the tension on the spring 28. Thus the force on the diaphragm assembly is decreased a proportionate amount, so that it tends to move back to its neutral position. As the valve member 47 moves back to the neutral position, the ball valve 60 is forced downwardly by the pin 62 until it is finally seated on the shoulder 59. At this point air can no longer flow from the pressure chamber 18 to the atmosphere and the system is again at equilibrium.

It should be pointed out that when the ball valves 35 and 69 are near their seated positions, they provide a throttling action on the air flowing through the valve. This is particularly important when the diaphragms are substantially restored to their neutral positions so as to prevent any tendency for the system to overshoot in the other direction.

From the foregoing description, it can be seen that the relay valve 10 is opened or closed by the position of the stem 20 in the motor valve 14. Thus, if the motor valve 14 should stick or hesitate to move for some reason, the relay valve 10 will remain open until the motor valve has responded to its correct position. Furthermore, if the control device connected to the stem 20 should resist movement due to unbalanced forces, friction or the like, the motor valve will still respond to its correct position. In this manner, error due to friction or other causes, which heretofore has been present in this type of motor valve, is substantially eliminated.

It is apparent that certain modifications may be made of the subject invention within the scope of the claims without departing from the spirit of the invention.

I claim.

1. A pneumatically operated relay valve adapted to be used in a system including a motor valve, a source of gas at a pressure other than atmospheric for actuating the motor valve, and a pneumatic signal generating device comprising: a casing having an inlet port adapted to be connected to the source of gas and an outlet port to the motor valve, a first valve means normally interrupting the flow of gas from said inlet to said outlet, an exhaust port adapted to communicate with the motor valve, a second valve means normally interrupting the flow between the motor valve and said exhaust port, a pressure signal receiving port adapted to be connected to the pneumatic signal generating means, diaphragm means actuated by the pressure signals received from the pneumatic signal generating means, said diaphragm means selectively opening and closing said first and second valve means in response to the signals from the pneumatic signal generating means, and mechanical means connected to said diaphragm means for correlating the movements of said motor valve actuated by the opening and closing of one of said first and second valve means to the position of said diaphragm means, said mechanical means including a variable ratio lever whereby the correlation of said movements may be varied.

2. A pneumatically operated relay valve adapted to be used in a system including a motor valve, a source of gas at a pressure other than atmospheric for actuating the motor valve, and a pneumatic signal generating device comprising: a casing having an inlet port adapted to be connected to the source of gas and an outlet port to the motor valve, a first valve means normally interrupting the flow of gas from said inlet to said outlet, an exhaust port adapted to communicate with the motor valve, a second valve means normally interrupting the flow between the motor valve and said exhaust port, a pressure signal receiving port adapted to be connected to the pneumatic signal generating means, diaphragm means actuated by the pressure signals received from the pneumatic signal generating means, said diaphragm means selectively opening and closing said first and second valve means in response to the signals from the pneumatic signal generating means, and mechanical means connected to said diaphragm means for correlating the movements of said motor valve actuated by the opening and closing of one of said first and second valve means to the position of said diaphragm means, said mechanical means including a variable ratio lever having a fulcrum adjustable with respect to the ends thereof wherein the correlation of said movements may be varied.

3. A pneumatically operated relay valve adapted to be used in a system including a motor valve, a source of gas at a pressure other than atmospheric for actuating the motor valve, and a pneumatic signal generating device comprising: a casing having an inlet port adapted to be connected to the source of gas and an outlet port to the motor valve, a first valve means normally interrupting the flow of gas from said inlet to said outlet, an exhaust port adapted to communicate with the motor valve, a second valve means normally interrupting the flow between the motor valve and said exhaust port, a pressure signal receiving port adapted to be connected to the pneumatic signal generating means, diaphragm means actuated by the pressure signals received from the pneumatic signal generating means, said diaphragm means selectively opening and closing said first and second valve means in response to the signals from the pneumatic signal generating means, and mechanical means connected to said diaphragm means for correlating the movements of said motor valve actuated by the opening and closing of one of said first and second valve means to the position of said diaphragm means, said mechanical means including a variable ratio lever having a fulcrum adjustable with respect to the ends thereof wherein the correlation of said movements may be varied, said mechanical means further including resilient means for connecting said variable ratio lever to said motor valve.

4. A pneumatically operated relay valve adapted to be used in a system including a motor valve, a source of gas at a pressure other than atmospheric for actuating the motor valve, and a pneumatic signal generating device comprising: a casing having an inlet port adapted to be connected to the source of gas and an outlet port to the motor valve, a first valve means normally interrupting the flow of gas from said inlet to said outlet, an exhaust port adapted to communicate with the motor valve, a second valve means normally interrupting the flow between the motor valve and said exhaust port, a pressure signal receiving port adapted to be connected to the pneumatic signal generating means, diaphragm means actuated by the pressure signals received from the pneumatic signal generating means, said diaphragm means selectively opening and closing said first and second valve means in response to the signals from the pneumatic signal generating means, mechanical means connected to said diaphragm means for correlating the movements of said motor valve actuated by the opening and closing of one of said first and second valve means to the position of said diaphragm means, said mechanical means including a variable ratio lever whereby the correlation of said movements may be varied, and spring means mounted on said casing for resisting movement of said diaphragm.

5. A pneumatically operated relay valve adapted to be used in a system including a motor valve, a source of gas at a pressure other than atmospheric for actuating the motor valve, and a pneumatic signal generating device comprising: a casing having an inlet port adapted to be connected to the source of gas and an outlet port to the motor valve, a first valve means normally interrupting the flow of gas from said inlet to said outlet, an exhaust port adapted to communicate with the motor valve, a second valve means normally interrupting the flow between the motor valve and said exhaust port, a pressure signal receiving port adapted to be connected to the pneumatic signal generating means, diaphragm means actuated by the pressure signals received from the pneumatic signal generating means, said diaphragm means selectively opening and closing said first and second valve means in response to the signals from the pneumatic signal generating means, mechanical means connected to said diaphragm means for correlating the movements of said motor valve actuated by the opening and closing of one of said first and second valve means to the position of said diaphragm means, said mechanical means including a variable ratio lever whereby the correlation of said movements may be varied, and spring means mounted on said casing for resisting movement of said diaphragm, said spring means having a preload thereon so that said diaphragm is actuated only by a signal of predetermined magnitude.

6. A pneumatically operated relay valve adapted to be used in a system including a motor valve, a source of gas at a pressure other than atmospheric for actuating the motor valve, and a pneumatic signal generating device comprising: a casing having an inlet port adapted to be connected to the source of gas and an outlet port to the motor valve, a first valve means normally interrupting the flow of gas from said inlet to said outlet, an exhaust port adapted to communicate with the motor valve, a second valve means normally interrupting the flow between the motor valve and said exhaust port, a pressure signal receiving port adapted to be connected to the pneumatic signal generating means, diaphragm means actuated by the pressure signals received from the pneumatic signal generating means, said diaphragm means selectively opening and closing said first and second valve means in response to the signals from the pneumatic signal generating means, mechanical means connected to said diaphragm means for correlating the movements of said motor valve actuated by the opening and closing of one of said first and second valve means to the position of said diaphragm means, said mechanical means including a variable ratio lever whereby the correlation of said movements may be varied, spring means mounted on said casing for resisting movement of said diaphragm, said spring means having a preload thereon so that said diaphragm is actuated only upon a signal of predetermined magnitude, and means for adjusting the preload on said spring.

References Cited in the file of this patent

UNITED STATES PATENTS

| | | |
|---|---|---|
| 2,336,887 | Piron | Dec. 14, 1943 |
| 2,411,748 | Kelley | Nov. 26, 1946 |
| 2,597,259 | Pray | May 20, 1952 |
| 2,753,146 | Wiegers | July 3, 1956 |
| 2,811,138 | Clements | Oct. 29, 1957 |
| 2,825,361 | Seljos | Mar. 4, 1958 |

FOREIGN PATENTS

| | | |
|---|---|---|
| 561,759 | Great Britain | June 2, 1944 |